(12) United States Patent
O'Hanrahan, Jr.

(10) Patent No.: US 11,981,299 B2
(45) Date of Patent: May 14, 2024

(54) SYSTEM, METHOD, AND APPARATUS FOR APPLYING TIRE SHINE TO VEHICLE TIRES

(71) Applicant: Edward O'Hanrahan, Jr., Homosassa, FL (US)

(72) Inventor: Edward O'Hanrahan, Jr., Homosassa, FL (US)

(*) Notice: Subject to any disclaimer, the term of this patent is extended or adjusted under 35 U.S.C. 154(b) by 295 days.

(21) Appl. No.: 17/478,253

(22) Filed: Sep. 17, 2021

(65) Prior Publication Data
US 2023/0087085 A1 Mar. 23, 2023

(51) Int. Cl.
| | |
|---|---|
| *A46B 15/00* | (2006.01) |
| *A46B 9/00* | (2006.01) |
| *A46B 11/06* | (2006.01) |
| *A46B 13/02* | (2006.01) |
| *B05B 9/00* | (2006.01) |
| *B05B 12/16* | (2018.01) |
| *B05C 1/00* | (2006.01) |
| *B05C 1/02* | (2006.01) |
| *B05C 11/10* | (2006.01) |
| *B25J 11/00* | (2006.01) |
| *B60S 3/04* | (2006.01) |

(52) U.S. Cl.
CPC ............... *B60S 3/04* (2013.01); *A46B 9/005* (2013.01); *A46B 11/063* (2013.01); *A46B 13/02* (2013.01); *A46B 15/0006* (2013.01); *B05B 9/007* (2013.01); *B05B 12/16* (2018.02); *B05C 1/00* (2013.01); *B05C 1/027* (2013.01); *B05C 11/1021* (2013.01); *B25J 11/0085* (2013.01); *B60S 3/042* (2013.01); *A46B 2200/20* (2013.01); *A46B 2200/3046* (2013.01)

(58) Field of Classification Search
None
See application file for complete search history.

(56) References Cited

U.S. PATENT DOCUMENTS

| | | | | |
|---|---|---|---|---|
| 6,260,225 | B1 * | 7/2001 | Bowman | B60S 3/042 |
| | | | | 118/304 |
| 10,368,630 | B2 * | 8/2019 | Jones | A46B 9/10 |
| 2005/0273962 | A1 * | 12/2005 | Dillon | A46B 9/10 |
| | | | | 15/169 |
| 2008/0178402 | A1 * | 7/2008 | Martines | B60S 3/042 |
| | | | | 15/53.4 |
| 2010/0272916 | A1 * | 10/2010 | Falbaum | B60S 3/04 |
| | | | | 118/679 |

(Continued)

*Primary Examiner* — Binu Thomas
(74) *Attorney, Agent, or Firm* — Larson & Larson; Frank Liebenow; Justin P. Miller (57) ABSTRACT

A tire shine application system includes a computer having at least one sensor interfaced thereto that detects and measures sizes of a tire of a vehicle as the vehicle enters a car wash. A tire shine applicator is interfaced to a three-directional movement device that is controlled by the computer. When the tire approaches the tire shine applicator, the computer controls the three-directional movement device to position the tire shine applicator to an outwardly facing wall of the tire and controls the three-directional movement device so that the tire shine applicator traverses the outwardly facing wall of the tire while tracking the tire as the tire shine applicator deposits tire shine liquid on the outwardly facing wall of the tire.

12 Claims, 11 Drawing Sheets

(56) References Cited

U.S. PATENT DOCUMENTS

| | | | | |
|---|---|---|---|---|
| 2013/0081569 A1* | 4/2013 | Wentworth | ............ | B60S 3/042 118/313 |
| 2013/0186432 A1* | 7/2013 | Wimmer | ................ | B60S 3/042 134/123 |
| 2018/0326446 A1* | 11/2018 | Anderson | ............... | B05C 1/027 |

* cited by examiner

SYSTEM, METHOD, AND APPARATUS FOR APPLYING TIRE SHINE TO VEHICLE TIRES

FIELD

This invention relates to the field of automated car washes and more particularly to a system for applying tire shine to a vehicle's tires.

BACKGROUND

Tire shine provides a new-car look to vehicles by making the tires look bright and new. Tire shine enhances the look of a vehicle, especially after the vehicle is washed and/or waxed.

Existing car wash systems provide less-automated ways to apply tire shine to tires of a vehicle. In many cases, this includes a worker manually applying or spraying tire shine onto the vehicle tires. While this is adequate for applying a tire shine solution to a surface of a vehicle tire, such systems require substantial labor and, as with any manual application, such systems are not optimally accurate resulting in tire shine spill-over onto the vehicle wheels, rims and body. Further, as tire shine typically often includes a material that has a low coefficient of friction (e.g. silicon, ethylene glycol, glycerin), overspray of such materials may reduce braking ability for some amount of time after application. Overspray of tire shine on the pavement of the carwash makes the pavement slippery, possibly leading to slip and falls as water is also present. Further, excess use of tire shine materials also creates a cost increase as the materials used are of relatively high cost.

Some car wash systems in which the tires rotate as the vehicle moves through the car wash deploy a tire shine application brush. Upon detection of the vehicle/tire, the brush is moved by an actuator to contact the lower portion of the tire and apply tire shine. In order to fully coat any expected tire, this brush must be long enough to contact the tire wall for a full rotation of the tire and high enough to contact the full height of the tire wall. For example, for a typical, maximum truck tire diameter of 40 inches, the brush must be at least 126 inches long (40 inches*3.14) and 14″ high to accommodate all expected tire wall heights (the difference between the diameter of the wheel and the diameter of the tire). As it is preferred to apply tire shine after the vehicle is washed, the length of this brush (e.g., 12 to 14 feet long) impacts the total length of the car wash, requiring more space and real estate to add this feature.

Tire shine materials are available for home application, usually in spray bottles. It is difficult for one to apply tire shine at home as the over-spray winds up on the floor beneath the vehicle and on wheels/rims and covering brake components. One could create a stencil that exposes only the surfaces of the tire hopefully for repeated use at home, but such stencil is not easy used in a car wash environment, as there are many tire sizes: tire widths and tire heights.

What is needed is a system that will automatically coat the outer surface of the tires of a vehicle during an automated carwash process without significantly increasing the overall length of the car wash.

SUMMARY

In one embodiment, a tire shine application system is disclosed for use in a car wash. The tire shine application system includes a computer having at least one sensor interfaced thereto, the sensor for detecting and measuring sizes of a tire of a vehicle. A tire shine applicator is included for applying tire shine to the tire and has a three-directional movement device controlled by the computer. The tire shine applicator is mechanically interfaced to the three-directional movement device for moving the tire shine applicator in an X-axis, a Y-axis, and a Z-axis plane of direction. The computer reads the sensor and detects a location and dimensions of a tire as the vehicle enters the car wash and when the tire approaches the tire shine applicator, the computer controls the three-directional movement device to position the tire shine applicator corresponding to an outwardly facing wall of the tire and controls the three-directional movement device so that the tire shine applicator traverses the outwardly facing wall of the tire while tracking the tire as the tire shine applicator deposits tire shine liquid on the outwardly facing wall of the tire.

In another embodiment, a method of applying tire shine to an outward facing wall of a tire of a vehicle in a car wash is disclosed including detecting and measuring sizes of the outward facing wall of the tire of the vehicle upon entering the car wash, then when the tire reaches a tire shine applicator in the car wash, controlling a three-directional movement device to locate tire shine applicator at the outward facing wall of the tire, the three-directional movement device moving the tire shine applicator in an X-axis, a Y-axis, and a Z-axis plane of direction. Then, further controlling the three-directional movement device to position the tire shine applicator to traverse the outwardly facing wall of the tire while tracking the tire as the tire shine applicator deposits tire shine liquid on the outwardly facing wall of the tire.

In another embodiment, a tire shine application system for use in a car wash is disclosed including a computer. A sensor is interfaced to the computer for detecting and measuring sizes of a tire of a vehicle. A three-directional movement device is operatively coupled to the computer and controlled by the computer to mechanically relocate a tire shine applicator in an X-axis, a Y-axis, and a Z-axis plane of direction. The tire shine applicator applies tire shine to the tire and the tire shine applicator is adjustable and the computer controls a width of the tire shine applicator corresponding to a width of an outwardly facing wall of the tire as detected by the sensor. The computer reads the sensor and detects a location and dimensions of a tire as the vehicle enters the car wash and when the tire approaches the tire shine applicator, the computer controls the three-directional movement device to position the tire shine applicator to an outwardly facing wall of the tire and controls the three-directional movement device to traverse the outwardly facing wall of the tire while tracking the tire as the tire shine applicator deposits tire shine liquid on the outwardly facing wall of the tire.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Reference will now be made in detail to the presently preferred embodiments of the invention, examples of which are illustrated in the accompanying drawings. Throughout the following detailed description, the same reference numerals refer to the same elements in all figures.

The tire shine application system provides for the application of tire shine to vehicle tires as part of a car wash system. Many car wash systems provide a conveyer 8 (see FIG. 6) on which the vehicles 6 (see FIG. 6) being washed stand. The conveyer 8 moves the vehicles 6 through various phases of washing such as soap application, pressure wash, wax application, drying, and, in the present invention, application of tire shine. Vehicles 6 typically have four tires, two on each side, and usually of the same tire size, though not necessarily, as some light trucks and pickup trucks have different tire sizes in the front and the back. As there are many tire sizes, having many different overall diameters (e.g., some diameters are over 40 inches), sidewall ratios, etc., the tire shine application system moves and adjusts to accommodate these size/location differences. In the examples shown, the tire shine applicator 40 is moved in all directions (X, Y, and Z) to position the shroud 72 over the tire 2. Note that although specific directional movement mechanisms are disclosed, there are no restrictions on the types of directional movement mechanisms used. For example, the disclosed directional movement mechanisms use a screw mechanism for X movement while it is equally anticipated to utilize a scissors jack mechanism or hydraulic jack device to impart X directional movement.

The directional movement mechanisms position the applicator mechanism over the tire 2 during application of the tire shine liquid 73 (see FIGS. 7 and 8), tracking the movement of the tire 2 as the vehicle is moved along the conveyer 8. Note that in embodiments in which the tires 2 are captured by the conveyer 8, the tires 2 do not rotate as the vehicle 6 is moved through the car wash, hence, the applicator 74 of the applicator mechanism must traverse the tire 2 (and not the wheel) to deposit tire shine liquid 73 on the entire surface of the tire 2. In embodiments in which the tire 2 rotates as the vehicle is moved through the car wash, the applicator mechanism traverses the tire 2 to deposit the tire shine while accommodating the rotation of the tire 2.

Figure 6:
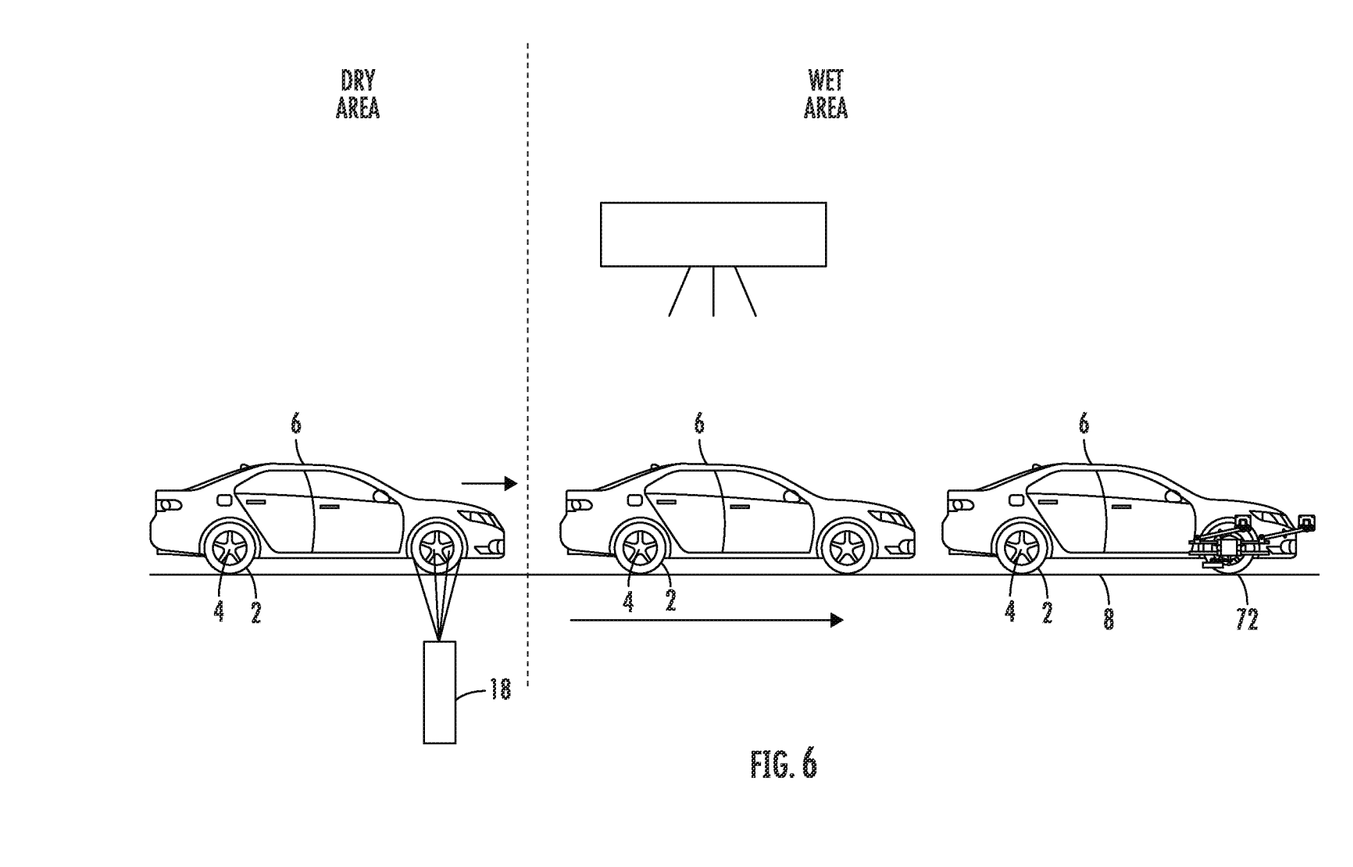
FIG. 6 illustrates an elevational view of the tire shine application system.
Figure 6A:
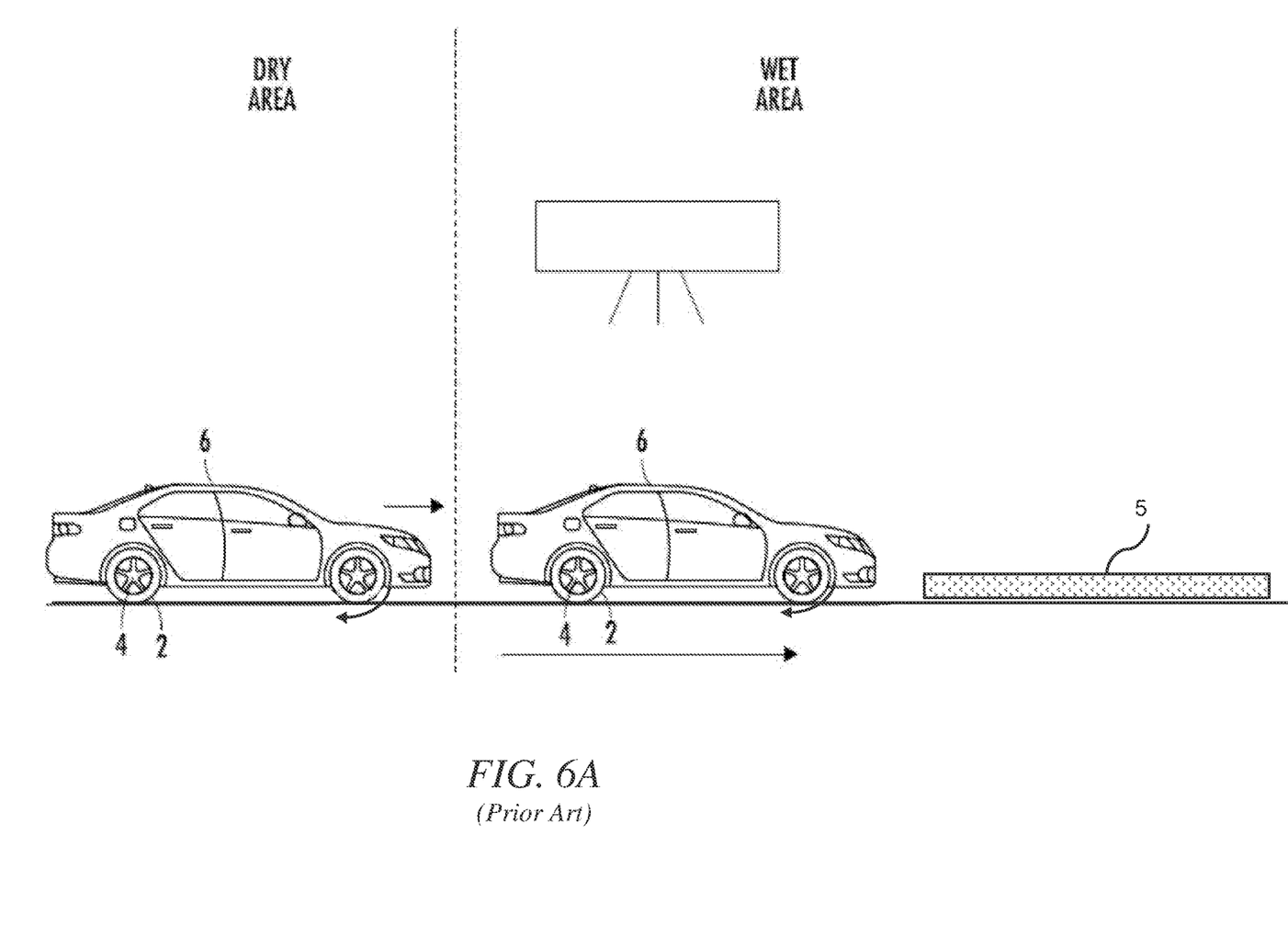
FIG. 6A illustrates a tire shine applicator of the prior art.

As shown in FIG. 6A, in a car wash of the prior art, rotation of the tire 2 is required as the vehicle 6 moves through the car wash and extremely long and wide brushes 5 (e.g., 125 inches long and 14 inches wide to accommodate 40" diameter tires 2) are required, one for each side of the vehicle. The full length of the brushes 5 are fed with tire shine liquid that is deposited on the wall of the tire 2 as the vehicle 6 moves through the car wash. The brushes 5 are moved toward/away from the tire 2 to accommodate different vehicle widths. Note that the disclosed system is much more compact, for example, measuring at most 36 inches long, basically the length of the directional movement mechanisms 10. This saves around 90 inches of required length over the prior art for deploying a car wash system that includes automatic application of tire shine.

Figure 1:
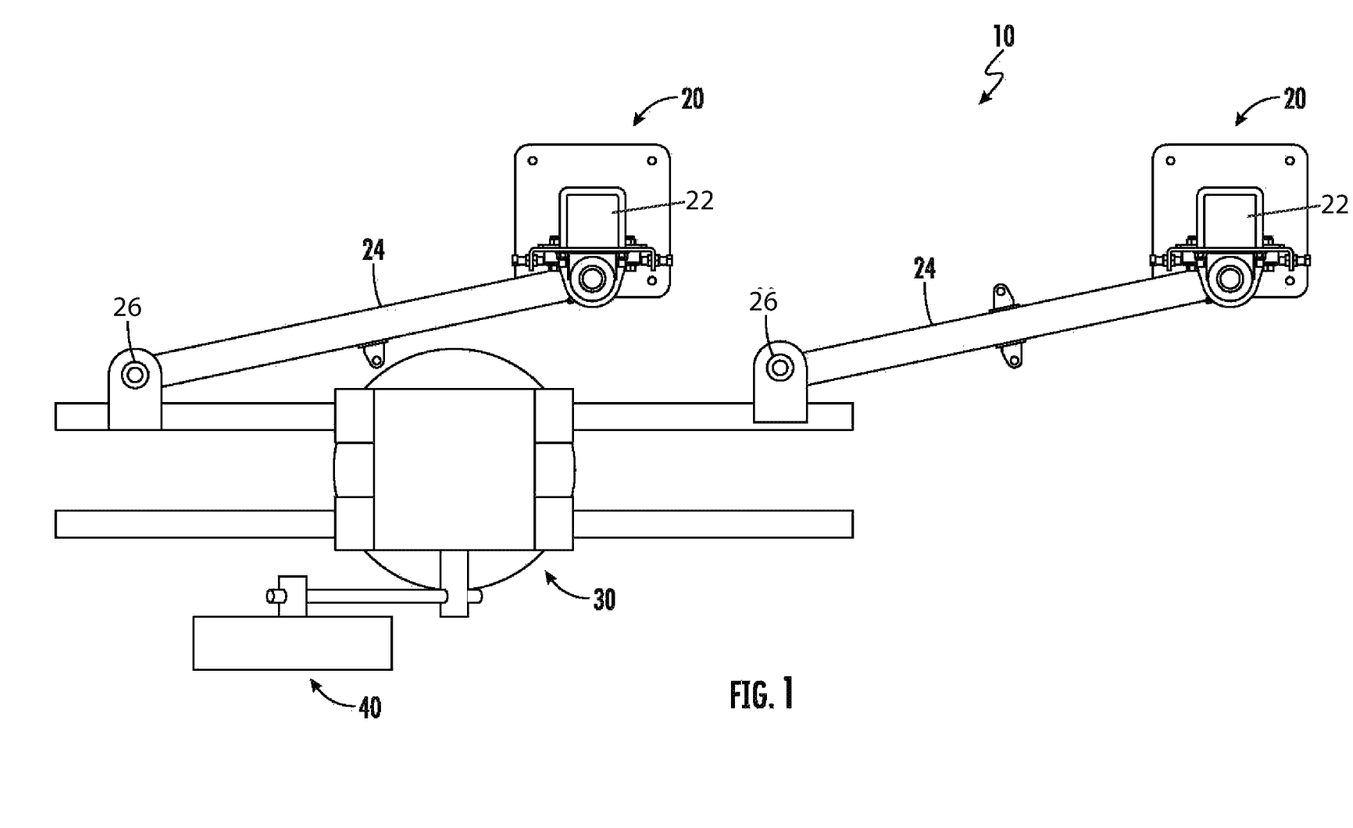
FIG. 1 illustrates a top view of a first directional movement mechanism of the tire shine application system.
Figure 2:
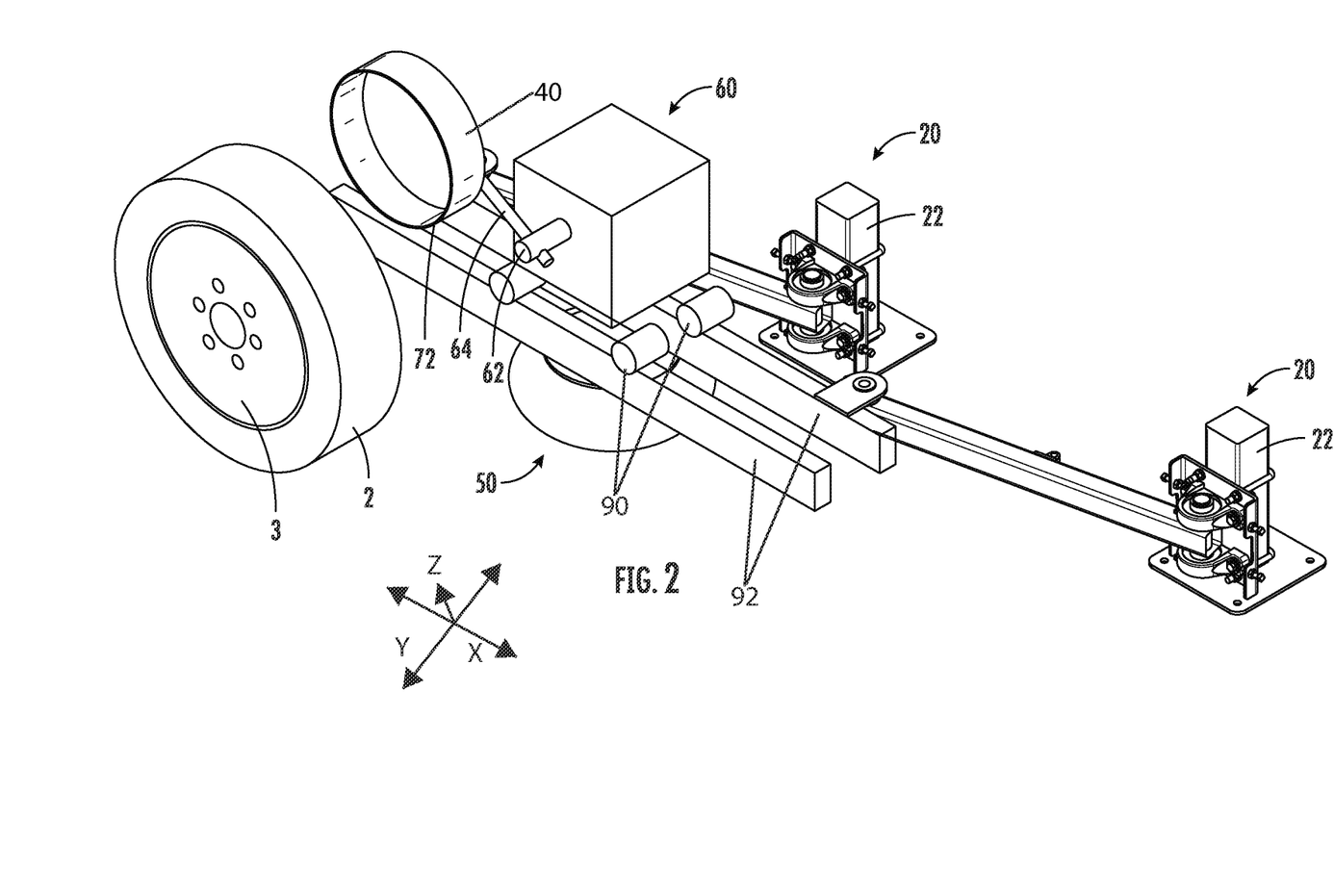
FIG. 2 illustrates a perspective view of the directional movement mechanisms of the tire shine application system ready to coat a tire.
Figure 3:
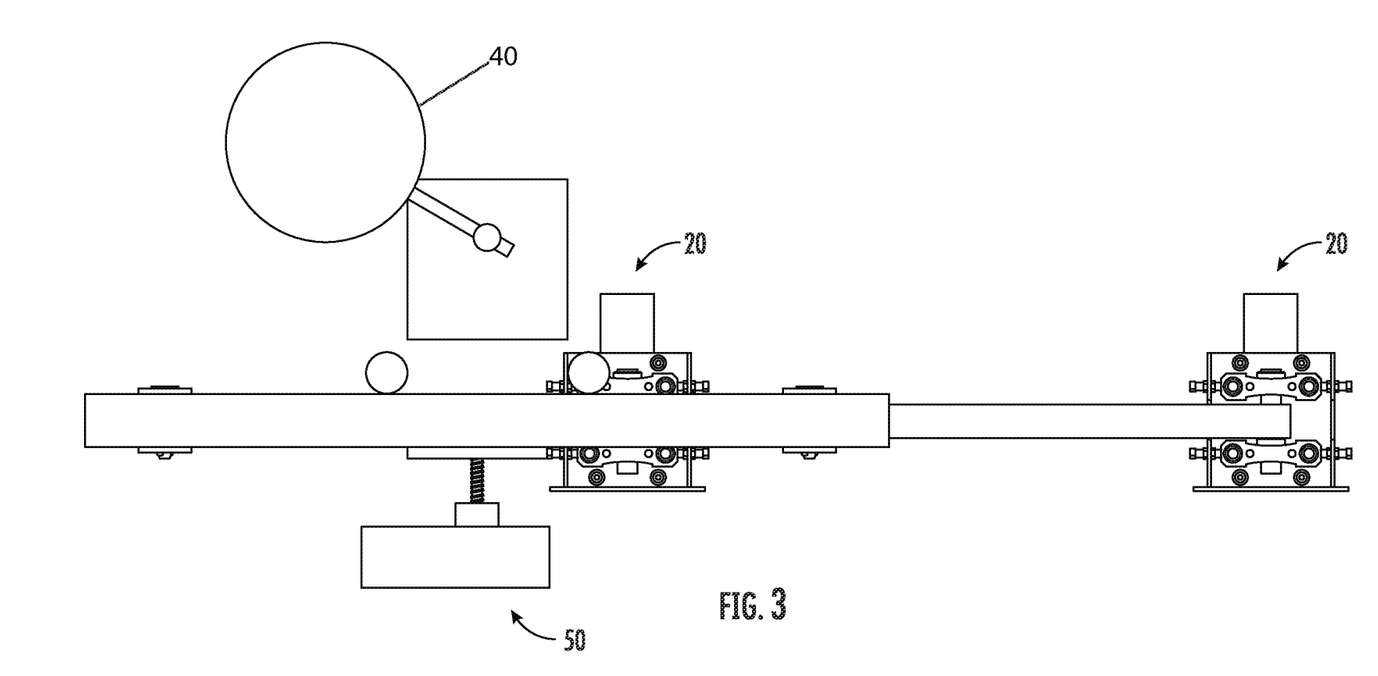
FIG. 3 illustrates a side view of the directional movement mechanisms showing an X-axis movement mechanism.

Referring to FIGS. 1-4, views of the directional movement mechanisms 10 (e.g., a three directional movement device) of the tire shine application system are shown. In FIG. 1, a Z-axis directional movement mechanism 20 is shown consisting of two rotational actuators coupled to tracks 92 by arms 24 and pivots 22. As the rotational actuators 22 rotate the base of the arms 24, the arms 24 swing in a Z-axis direction, moving the tire shine applicator 40 towards or away from the vehicle 6 and tire 2, e.g., in the Z-axis plane. By having two rotational actuators, each with arms 24 that are connected to pivots 22, the tire shine applicator 40 remains parallel to conveyer 8 and the vehicle 6.

Figure 4:
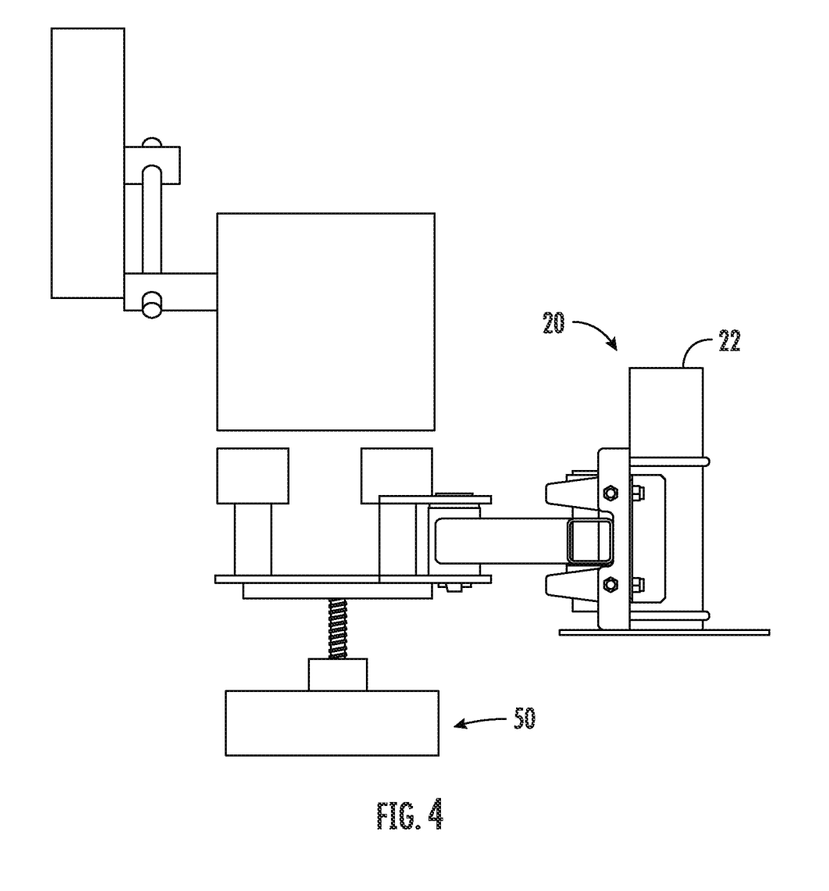
FIG. 4 illustrates a second view of the side view of the directional movement mechanisms showing an X-axis movement mechanism.

The X-axis directional movement mechanism 50 moves the tire shine applicator 40 in an X-axis plane and lifts/lowers the entire system, including the tire shine applicator 40, by way of a screw as shown in FIG. 4. Further X-axis movement is provided by rotation of a shaft 62 by an actuator motor 60 in tandem with the X-axis directional movement mechanism 50.

Y-axis movement is imparted by rollers 90 on tracks 92, moving the actuator motor 60 and tire shine applicator 40 along the tracks to follow the vehicle 6 and tires 2 moving the applicator in a Y-axis plane.

In the embodiment shown, X-axis and Y-axis movement is also imparted by rotation of a shaft 62 (e.g., by an actuator) resulting in rotational movement of an X/Y arm 64, moving the applicator 74 up/down (X-axis) and forward/backward (Y-axis) as needed to traverse the outwardly facing wall of the tire 2.

Figure 5:
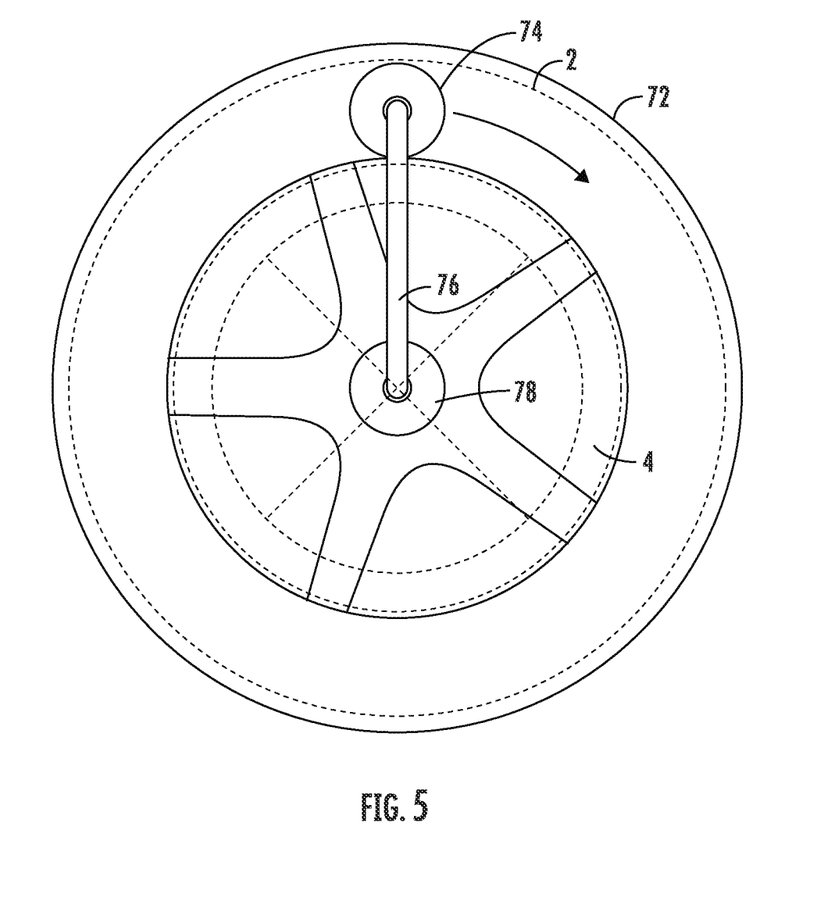
FIG. 5 illustrates a plan view of the applicator mechanism of the directional movement mechanisms.

Referring to FIG. 5, a plan view of an embodiment of the applicator mechanism 40 of the directional movement mechanisms is shown. In some embodiments, the applicator mechanism 40 includes a shroud 72 for reducing overspray during application of tire shine. The actual applicator 74 is, for example, a sponge brush, bristle brush, or spray applicator (e.g., atomizer) that is fed with tire shine liquid, for example, through channels in the applicator motor axle and arm 76. The applicator motor 78 rotates the applicator motor axle and arm 76 to move the applicator 74 to traverse the outwardly facing wall of the tire 2. Since the applicator 74 is of limited size, the applicator 74 keeps from depositing tire shine liquid 73 on the wheel 4.

Figure 7:
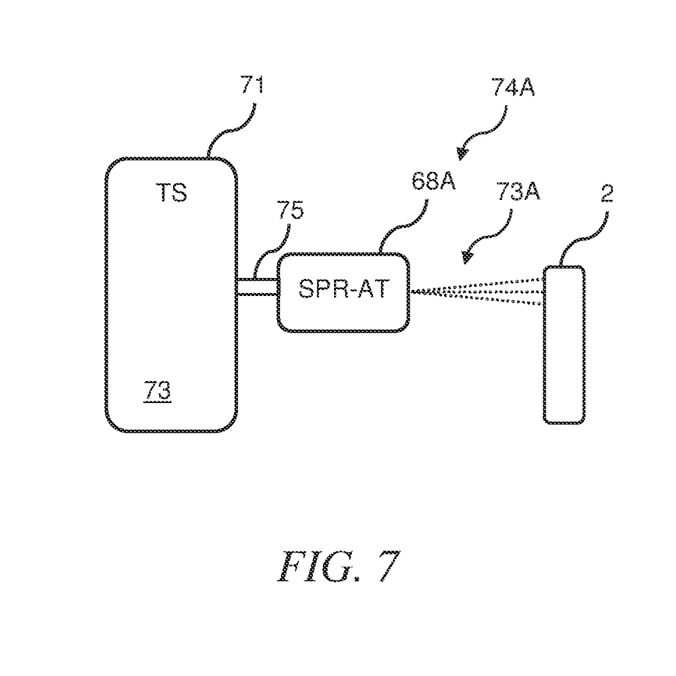
FIGS. 7 and 8 illustrate sample applicators of the tire shine application system.
Figure 8:
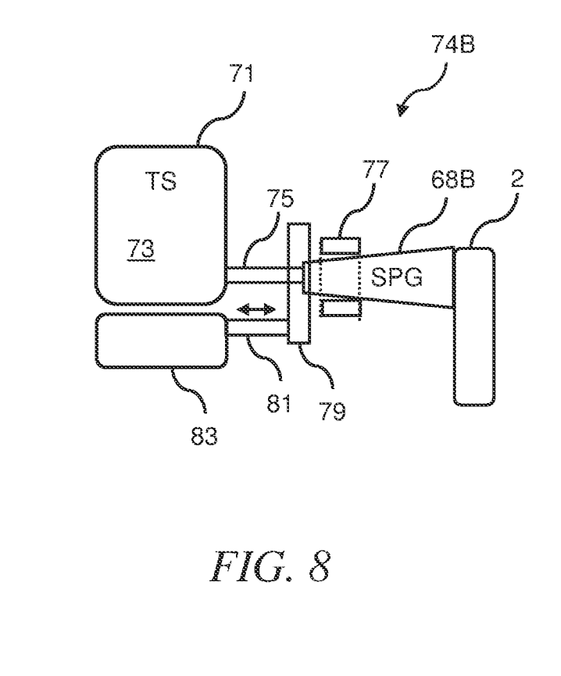

In some embodiments, the applicator 74 is fixed to the X/Y arm 64 and there is no applicator motor 78 and the above-described directional movement mechanisms 10 (or equivalent) directly move the applicator 74 in the X-axis, Y-axis, and Z-axis to traverse the outwardly facing wall of the tire 2. Note that two examples (applicator 74A and applicator 74B) of an applicator 74 are shown in FIGS. 7 and 8.

Referring to FIG. 6, an elevational view of the tire shine application system is shown. In this view, details of the directional movement mechanisms are left out for clarity and brevity reasons. Note that in some embodiments, the tire shine application system includes two mirrored applicator mechanisms 40, one for each side of the vehicle 4, though it is also anticipated that there be more mirrored applicator mechanisms 40 to apply tire shine concurrently to multiple tires 2.

In the tire shine application system, one or more sensors 18 are configured to determine dimensions of the tire 2, number of tires 2 and spacing of tires 2 as the vehicle 6 enters the car wash. Note that many vehicles have four tires 2 (two on each side), but some vehicles 6 such as trucks and pickup trucks have more than two sets of tires 2, each requiring application of tire shine. Therefore, the sensors 18 are read to determine the dimensions of each of the tires 2, the number of tires 2, and the spacing of the tires 2. Information derived from the sensors 18 is later used to position and control the applicator mechanisms 40.

Although may different sensors 18 are anticipated such as ultrasonic sensors and mechanical sensors, one such sensor 18 is a camera. Most vehicles 6 have similar size tires 2 on each side of the vehicle 6 and a single sensor 18 is anticipated, though in some embodiments, there is a sensor 18 on each side of the vehicle 6 for rare situations in which there are different sized tires 2 (opposing tires) on the vehicle, for example, when a spare tire is deployed. It is preferred that the sensor 18 be located in a dry area of the car wash to keep the sensor 18 as clean and dry as possible, for example, at a location where the vehicle is moved onto the conveyer 8.

Preferably after the vehicle is washed and the tires 2 are clean (and in some embodiments, dry), each tire 2 passes the tire shine applicator mechanisms 40 and the directional movement mechanisms are engaged to position the applicator mechanisms 40 or applicator 74 over the tire 2 and the tire shine applicator mechanism 40 or the applicator 74 traverses the outwardly facing wall of the tire 2 to deposit the tire shine liquid 73 on the face of the tire 2. As the conveyer 8 is in motion and, therefore, the vehicle 6 is also in motion, the directional movement mechanisms move the tire shine application mechanism 40 to follow the vehicle 6 and, hence follow the tire 2.

Referring to FIGS. 7 and 8, sample applicators 74A/74B of the tire shine application system are shown. Although any device that deposits tire shine liquid 73 on a tire 2, two sample applicators 74A/74B are shown. In FIG. 7, a first sample applicator 74A is an atomizing spray device 68A that receives tire shine liquid 73 from a holding tank 71 through a feed tube 75. The atomizing spray device 68A emits a spray 73A of tire shine liquid 73 that is directed onto the outwardly facing wall of the tire 2 as the first sample applicator 74A is moved around the outwardly facing wall of the tire 2. By adjusting a nozzle of the atomizing spray device 68A, a divergence of the spray 73A of tire shine liquid 73 is controlled to land on the outwardly facing wall of the tire 2, limiting overspray. Further, in some embodiments, the above-described directional movement apparatus moves the first sample applicator 74A to a position in which the width of the spray 73A matches a size of the face of the tire 2. For example, moving the first sample applicator 74A to a position closer to the outwardly facing wall of the tire 2 will decrease the coverage area of tire shine liquid 73. Of course, it is further anticipated that more or less tire shine liquid 73 be emitted to account for the surface area at the outwardly facing wall of the tire 2.

In FIG. 8, a second sample applicator 74B is a contact applicator 68B (e.g., a sponge brush, bristle brush, or other type of brush). The contact applicator 68B receives tire shine liquid 73 from a holding tank 71 through a feed tube 75 that wets the contact applicator 68B. The contact applicator 68B of the second sample applicator 74B touches the outwardly facing wall of the tire 2 as the second sample applicator 74B moves around the outwardly facing wall of the tire 2, depositing the tire shine on the outwardly facing wall of the tire 2.

In some embodiments, a diameter of the contact applicator 68B is adjusted to match a width of the outwardly facing wall of the tire 2 by pulling/pushing an end of the contact applicator 68B through a restricting collar 77. For example, an end of the contact applicator 68B that is distal from the outwardly facing wall of the tire 2 is bonded to a bracket 79 and the bracket 79 is fixed to an arm 81 of a size-adjusting actuator 83. The bracket is pulled or pushed by a size-adjusting actuator 83 to force the end of the contact applicator 68B to be pushed into or pulled out of the restricting collar 77, thereby adjusting a diameter or width of the contact applicator 68B where the contact applicator 68B contacts the outwardly facing wall of the tire 2. Additionally, the above-described directional movement apparatus moves the second sample applicator 74B to a position in which the contact applicator 68B touches the outwardly facing wall of the tire 2.

Figure 9:
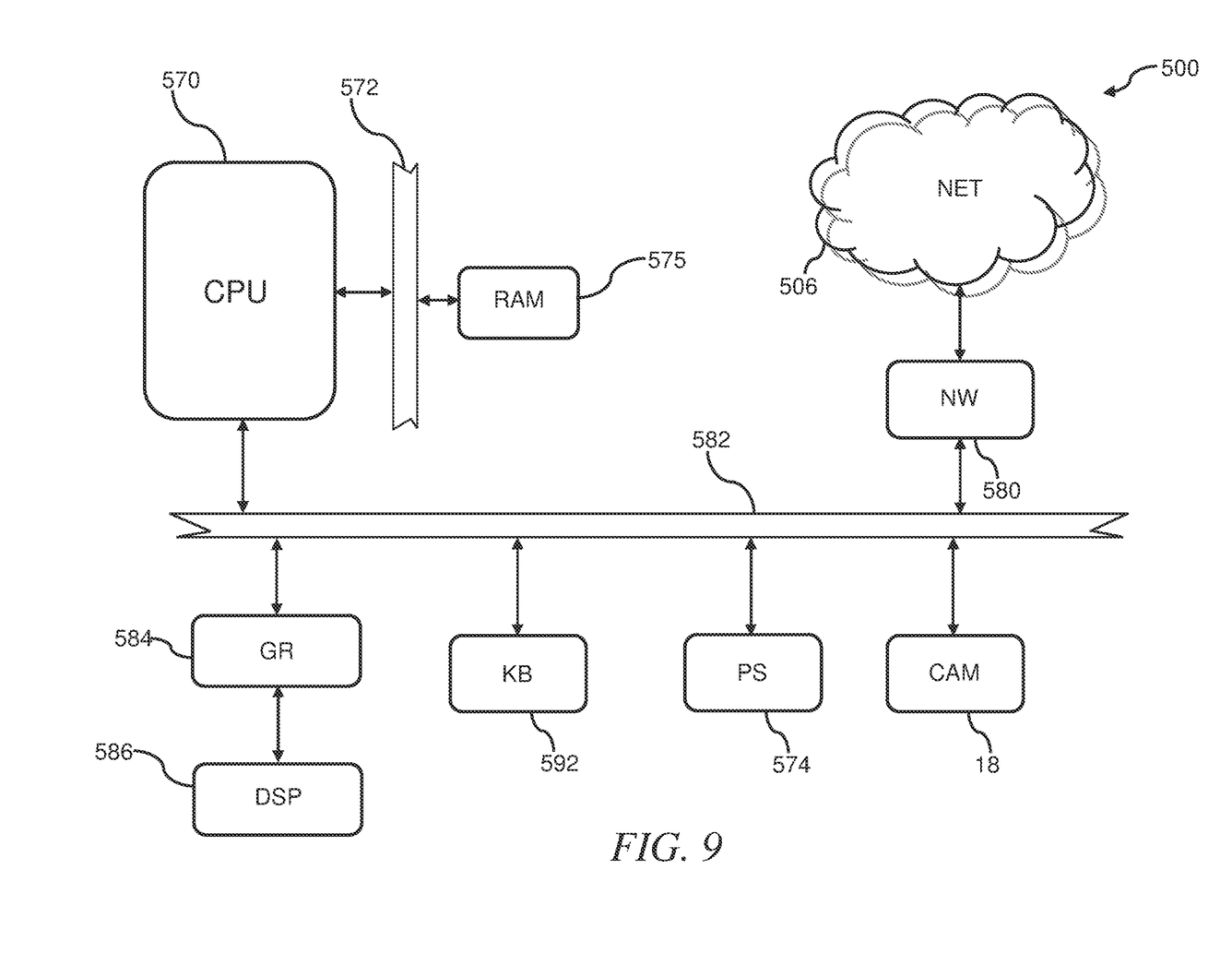
FIG. 9 illustrates a schematic view of a typical computer system as used in the tire shine application system.

Referring to FIG. 9, a schematic view of a typical computer system 500 as used in the tire shine application system is shown. This typical computer system 500 is shown in its simplest form. Different architectures are known that accomplish similar results in a similar fashion and the present invention is not limited in any way to any particular computer system architecture or implementation. In this typical computer system 500, a processor 570 executes or runs programs in a random-access memory 575. The programs are generally stored within a persistent memory 574 and loaded into the random-access memory 575 when needed. The processor 570 is any processor, typically a processor designed for computer systems with any number of core processing elements, etc. The random-access memory 575 is connected to the processor by, for example, a memory bus 572. The random-access memory 575 is any memory suitable for connection and operation with the selected processor 570, such as SRAM, DRAM, SDRAM, RDRAM, DDR, DDR-2, etc. The persistent memory 574 is any type, configuration, capacity of memory suitable for persistently storing data, for example, magnetic storage, flash memory, read only memory, battery-backed memory, etc. The persistent memory 574 is typically interfaced to the processor 570 through a system bus 582, or any other interface as known in the industry.

Also shown connected to the system bus 582 is a network interface 580 (e.g., for connecting to a network 506), a graphics adapter 584 and a keyboard interface 592 (e.g., Universal Serial Bus—USB). The graphics adapter 584 receives information from the processor 570 and controls what is depicted on a display 586. The keyboard interface 592 provides navigation, data entry, and selection features.

In general, some portion of the persistent memory 574 is used to store programs, executable code, data, and other data, etc.

One or more sensors 18 (e.g., cameras, ultrasonic sensors, infrared sensors) is/are interface to the processor 570, for example, through the system bus 582. The sensors 18 provide data to the processor regarding the position of the vehicle 6, the location/number of tires 2, and the dimensions of the tires 2. The peripherals are examples and other devices are known in the industry such as pointing devices, touchscreen interfaces, speakers, microphones, USB interfaces, Bluetooth transceivers, Wi-Fi transceivers, image sensors, temperature sensors, etc., the details of which are not shown for brevity and clarity reasons.

Figure 10:
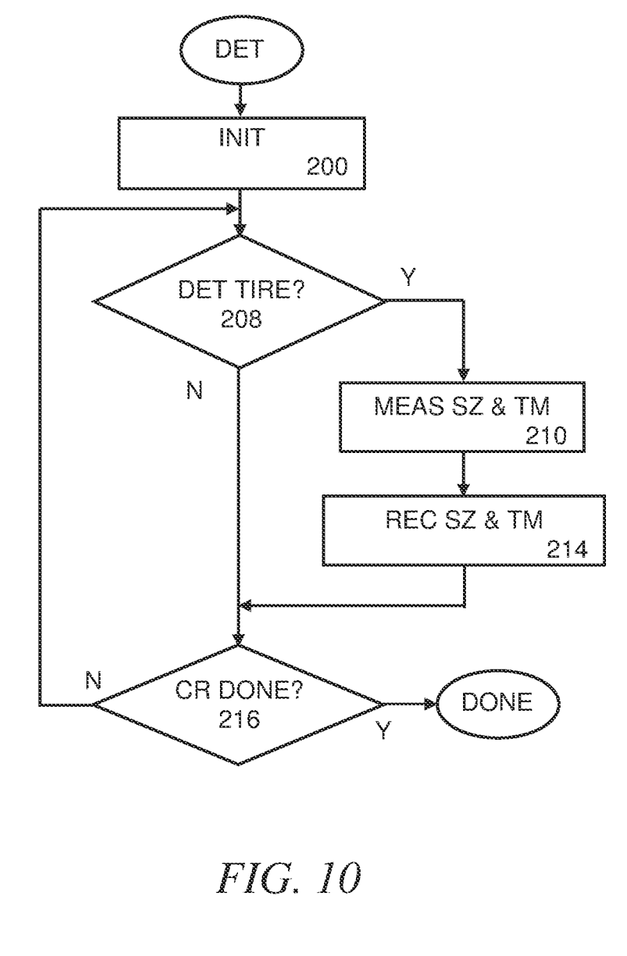
FIGS. 10 and 11 illustrate sample program flows of the computer system as used in the tire shine application system.
Figure 11:
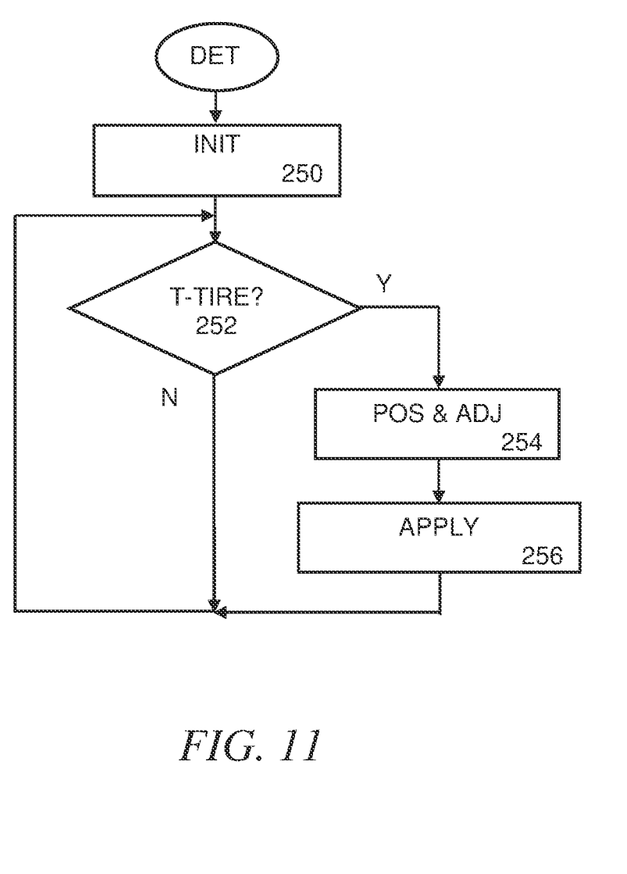

Referring to FIGS. 10 and 11, sample program flows of the computer system as used in the tire shine application system are shown. The sample program flows are divided into two phases. The first phase is preferable performed when the vehicle 6 is in a dry area of the car wash (before the wash/wax), thereby limiting liquid spray onto the sensor(s) 18. After initialization 200, as the vehicle 6 passes by the sensor(s) 18, the software utilizes the sensor(s) 18 to detect 208 a tire 2 of the vehicle 6. If no tire 2 is detected 208, then a test 216 is made to determine if the current vehicle 6 has passed (e.g., the entire vehicle 6 is past the sensor(s) 18). Note that for clarity and brevity reasons, the method of determining when the vehicle 6 has passed the sensor(s) 18 such as other sensors, electrical switches, pressure sensors, etc.

When, instead, a tire 2 is detected 208, data is captured from the sensor(s) 18 to measure the dimensions and timing 210 of the tire 2. For example, the data captured regarding the dimension and timing 210 includes the diameter of the tire and the diameter of the wheel and/or the width of the tire surface. The timing is later used to determine when the tire 2 will pass the tire shine applicator and the dimensions are later used to control deposition of the tire shine adjusted for the diameter of the tire 2 and width of the outwardly facing wall of the tire 2 (sidewall). The dimensions are then stored 214 for retrieval when the vehicle approaches the tire shine applicator. Once the test 216 to determine if the current vehicle 6 has passed indicates so, the above process is repeated for the next vehicle 6.

As shown in FIG. 11, after initialization 250, a timing test 252 is made using the timing data that was stored above to determine the timing of when the tire 2 will be proximal to the tire shine applicator. Once the timing test 252 determines that a tire 2 is located at the tire shine applicator. The tire shine applicator is positioned and adjusted 254 for the dimensions of the outwardly facing wall of the tire 2 and then the tire shine applicator is operated 256 do deposit the tire shine liquid 73 on the outwardly facing wall of the tire 2.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A tire shine application system for use in a car wash, the tire shine application system comprising:
    a computer;
    a sensor interfaced to the computer for detecting and measuring sizes of a tire of a vehicle;
    a tire shine applicator for applying tire shine liquid to the tire;
    a three-directional movement device controlled by the computer and mechanically interfaced to the tire shine applicator for moving the tire shine applicator in an X-axis plane of direction, a Y-axis plane of direction, and a Z-axis plane of direction; and
    whereas the computer reads the sensor and detects a location and dimensions of the tire as the vehicle enters the car wash and when the tire approaches the tire shine applicator, the computer controls the three-directional movement device to position the tire shine applicator corresponding to an outwardly facing wall of the tire and the computer controls the three-directional movement device to traverse the outwardly facing wall of the tire while tracking the tire as the tire shine applicator deposits tire shine liquid on the outwardly facing wall of the tire;
    wherein the tire shine applicator comprises a brush that deposits the tire shine liquid on the outwardly facing wall of the tire through contact with the outwardly facing wall of the tire, the computer controls a width of the tire shine applicator corresponding to a width of the outwardly facing wall of the tire by pulling or pushing an end portion of the brush into or out of a restricting collar.

2. The tire shine application system of claim 1, wherein the tire shine applicator is interfaced to the three-directional movement device through a rotational device, the rotational device moving the tire shine applicator circularly to traverse the outwardly facing wall of the tire.

3. The tire shine application system of claim 1, wherein the brush is made of bristles.

4. The tire shine application system of claim 1, wherein the brush is a sponge brush.

5. A method of applying tire shine to an outward facing wall of a tire of a vehicle in a car wash, the method comprising:
    detecting and measuring sizes of the outward facing wall of the tire of the vehicle upon entering the car wash;
    when the tire reaches a tire shine applicator in the car wash, controlling a three-directional movement device to locate tire shine applicator at the outward facing wall of the tire, the three-directional movement device moving the tire shine applicator in an X-axis, a Y-axis, and a Z-axis plane of direction;
    controlling the three-directional movement device to position the tire shine applicator, traversing the outwardly facing wall of the tire while tracking the tire as the tire shine applicator deposits tire shine liquid on the outwardly facing wall of the tire;
    the tire shine applicator comprising a brush, the brush depositing the tire shine liquid on the outwardly facing wall of the tire through contact with the outwardly facing wall of the tire and the tire shine applicator changing a width of the brush by pulling or pushing an end portion of the brush into or out of a restricting collar; and
    the tire shine applicator adjusting a width of the tire shine applicator corresponding to a width of the outwardly facing wall of the tire.

6. The method of claim 5, wherein the tire shine applicator is interfaced to the three-directional movement device through a rotational device, the rotational device moving the tire shine applicator circularly to traverse the outwardly facing wall of the tire.

7. The method of claim 5, wherein the brush is made of bristles.

8. The method of claim 5, wherein the brush is a sponge brush.

9. A tire shine application system for use in a car wash, the tire shine application system comprising:
    a computer;
    a sensor interfaced to the computer for detecting and measuring sizes of a tire of a vehicle;
    a tire shine applicator for applying tire shine liquid to the tire, the tire shine applicator is adjustable and the computer controls a width of the tire shine applicator corresponding to a width of an outwardly facing wall of the tire as detected by the sensor;

a three-directional movement device controlled by the computer and mechanically interfaced to the tire shine applicator for moving the tire shine applicator in an X-axis, a Y-axis, and a Z-axis plane of direction;

whereas the computer reads the sensor and detects a location and dimensions of the tire as the vehicle enters the car wash and when the tire approaches the tire shine applicator, the computer controls the three-directional movement device to position the tire shine applicator corresponding to an outwardly facing wall of the tire and the computer controls the three-directional movement device to traverse the outwardly facing wall of the tire while tracking the tire as the tire shine applicator deposits tire shine liquid on the outwardly facing wall of the tire; and wherein the tire shine applicator comprises a brush that deposits the tire shine liquid on the outwardly facing wall of the tire through contact with the outwardly facing wall of the tire, the computer controls a width of the tire shine applicator by pulling or pushing an end portion of the brush into or out of a restricting collar.

10. The tire shine application system of claim 9, wherein the tire shine applicator is interfaced to the three-directional movement device through a rotational device, the rotational device moving the tire shine applicator circularly to traverse the outwardly facing wall of the tire.

11. The tire shine application system of claim 9, wherein the brush is made of bristles.

12. The tire shine application system of claim 9, wherein the brush is a sponge brush.

\* \* \* \* \*